United States Patent
Mah et al.

(10) Patent No.: US 7,536,601 B2
(45) Date of Patent: May 19, 2009

(54) METHOD, SYSTEM AND PROGRAM FOR IDENTIFYING A TEST SPECIFICATION FOR TESTING A FILE ELEMENT

(75) Inventors: Ernest Wing Mah, Markham (CA); Lawrence Alan Mandel, Toronto (CA); Craig Salter, Hamilton (CA)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 10/921,694

(22) Filed: Aug. 19, 2004

(65) Prior Publication Data

US 2006/0041792 A1    Feb. 23, 2006

(51) Int. Cl.
*G06F 11/00* (2006.01)

(52) U.S. Cl. .......................... 714/38; 717/124
(58) Field of Classification Search ............. 714/38; 717/124
See application file for complete search history.

(56) References Cited

U.S. PATENT DOCUMENTS

| | | | |
|---|---|---|---|
| 6,925,633 B1* | 8/2005 | Barnett et al. ............. | 717/124 |
| 2003/0093717 A1* | 5/2003 | Mason ....................... | 714/38 |
| 2003/0135792 A1* | 7/2003 | Chen ......................... | 714/38 |
| 2003/0167423 A1* | 9/2003 | Murakami et al. ......... | 714/38 |
| 2004/0194064 A1* | 9/2004 | Ranjan et al. ............. | 717/124 |
| 2006/0026463 A1* | 2/2006 | Paliwal et al. ............. | 714/37 |
| 2006/0150026 A1* | 7/2006 | Kolawa et al. ............. | 714/38 |

* cited by examiner

Primary Examiner—Yolanda L Wilson
(74) Attorney, Agent, or Firm—Hamilton & Terrile

(57) ABSTRACT

A file validator technique for identifying a test specification to be used for testing validity of a file element associated with a file is provided. The test specification is a member in one of a set of test specifications embedded in the file validator and a set of test specifications not embedded in the file validator. According to the technique, a file element is selected, a pointer associated with the selected file element is selected, and a pointer is used to select the test specification associated with the selected file element, the selected test specification being selectable from one of the set of test specifications embedded in the file validator and the set of test specifications not embedded in the file validator.

8 Claims, 2 Drawing Sheets

METHOD, SYSTEM AND PROGRAM FOR IDENTIFYING A TEST SPECIFICATION FOR TESTING A FILE ELEMENT

BACKGROUND OF THE INVENTION

1. Field of the Invention

The present invention relates to testing file elements in general, and more specifically the present invention relates to a method, system and article of manufacture for identifying a test specification to be used in testing of a file element.

2. Description of the Related Art

As communications protocols and message formats are standardized in the web community, it becomes increasingly possible and important to be able to describe the communications in some structured way. WSDL (Web Services Description Language) addresses this need by defining an XML grammar for describing network services as collections of communication endpoints capable of exchanging messages. WSDL service definitions provide documentation for distributed systems and serve as a recipe for automating the details involved in applications communication.

A WSDL document defines services as collections of network endpoints, or ports. In WSDL, the abstract definition of endpoints and messages is separated from their concrete network deployment or data format bindings. This allows the reuse of abstract definitions: messages, which are abstract descriptions of the data being exchanged, and port types which are abstract collections of operations. The concrete protocol and data format specifications for a particular port type constitute a reusable binding. A port is defined by associating a network address with a reusable binding, and a collection of ports define a service. Hence, a WSDL document uses the following elements in the definition of network services:

Types—a container for data type definitions using some type system (such as XSD).
Message—an abstract, typed definition of the data being communicated.
Operation—an abstract description of an action supported by the service.
Port Type—an abstract set of operations supported by one or more endpoints.
Binding—a concrete protocol and data format specification for a particular port type.
Port—a single endpoint defined as a combination of a binding and a network address.
Service—a collection of related endpoints.

It is important to observe that WSDL does not introduce a new type definition language. WSDL recognizes the need for rich type systems for describing message formats, and supports the XML Schemas specification (XSD) [W3C Working Draft "XML Schema Part 2: Datatypes"] as its canonical type system. However, since it is unreasonable to expect a single type system grammar to be used to describe all message formats present and future, WSDL allows using other type definition languages via extensibility. In addition, WSDL defines a common binding mechanism. This is used to attach a specific protocol or data format or structure to an abstract message, operation, or endpoint. It allows the reuse of abstract definitions.

File elements, associated with a file, are structured using WSDL syntax and semantics, and the file elements may be validated by a file validator. Over time, newer file elements (sometimes referred to as extensibility elements) are developed and accepted, and these newer file elements must be tested for validity. These new file elements may allow different technologies to provide bindings for abstract entities in WSDL (such as messages, operations and the like). Unfortunately, the file validator may not be able to completely test the validity of the newer file elements. Once new extensibility elements are introduced, the file validator is reconstructed and redistributed to users so that the newly constructed file validator may be able to validate these newer file elements. It is generally inconvenient to develop and reissue a newer version of the file validator each time new types of file elements are created or developed. Must time and money may be wasted in redevelopment costs associated with developing the newer file validator. Accordingly, a solution that addresses, at least in part, this and other shortcomings is desired.

SUMMARY OF THE INVENTION

It is an object of the present invention to provide a data processing system, data processing implemented method and article of manufacture for generating installation merge packages which obviates or mitigates at least one disadvantage associated with the prior art.

In an aspect of the present invention, there is provided, for a file validator implemented on a data processing system, a file validator implemented method of identifying a test specification to be used for testing validity of a file element associated with a file, the test specification being a member in one of a set of test specifications embedded in the file validator and a set of test specifications not embedded in the file validator, the file validator implemented method including: selecting the file element, selecting a pointer associated with the selected file element, and using a pointer to select the test specification associated with the selected file element, the selected test specification being selectable from one of the set of test specifications embedded in the file validator and the set of test specifications not embedded in the file validator.

In another aspect of the present invention, there is provided a file validator implemented on a data processing system, the file validator for identifying a test specification to be used for testing validity of a file element associated with a file, the test specification being a member in one of a set of test specifications embedded in the file validator and a set of test specifications not embedded in the file validator, the file validator including: a selecting module for selecting the file element, a selector module for selecting a pointer associated with the selected file element, and a using module for using a pointer to select the test specification associated with the selected file element, the selected test specification being selectable from one of the set of test specifications embedded in the file validator and the set of test specifications not embedded in the file validator.

In yet another aspect of the present invention, computer readable code is provided for directing a file validator implemented on a data processing system, the file validator for identifying a test specification to be used for testing validity of a file element associated with a file, the test specification being a member in one of a set of test specifications embedded in the file validator and a set of test specifications not embedded in the file validator. The computer readable code includes a program usable medium embodying one or more instructions executable by the data processing system, the one or more instructions including: data processing system executable instructions for selecting the file element, data processing system executable instructions for selecting a pointer associated with the selected file element, and data processing system executable instructions for using a pointer to select the test specification associated with the selected file element, the selected test specification being selectable from one of the set of test specifications embedded in the file validator and the set of test specifications not embedded in the file validator.

BRIEF DESCRIPTION OF THE DRAWINGS

A better understanding of these and other embodiments of the present invention can be obtained with reference to the following drawings and detailed description of the preferred embodiments, in which.

Similar references are used in different figures to denote similar components.

DESCRIPTION OF THE PREFERRED EMBODIMENTS

Figure 1:
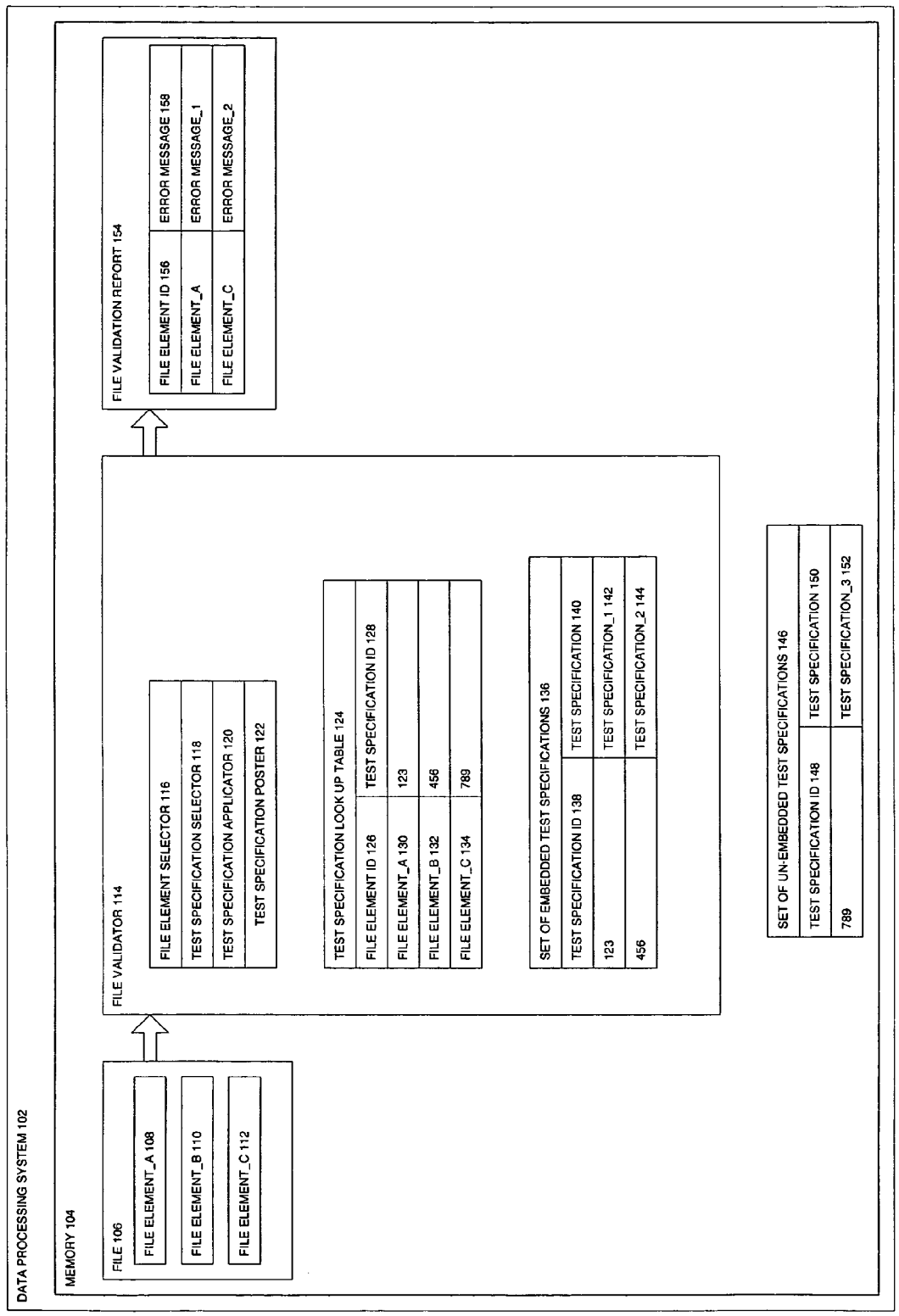
FIG. 1 shows a file validator for validating file elements associated with a file.

FIG. 1 shows a file validator 114 used for testing validity of file elements 108, 110 and 112 associated with a file 106. The file 106 contains elements such as FILE ELEMENT_A 108, FILE ELEMENT_B 110 and FILE ELEMENT_C 112. The file validator 114 may be implemented on a data processing system 102. The data processing system 102 includes a memory 104 used for storing the file 106, the file validator 114 and a file validations report 154.

Upon request from a user, the file validator 114 validates the each element of the file 106, and then generates the file validation report 154. The file validation report 154 identifies each file element of the file 106 and associates a respective error message with each file element. The user examines the file validation report 154 and determines which file elements of the file 106 may require amendment, amend any deemed non-valid file elements, and then may execute the file validator 114 once again until the user is satisfied that the file 106 contains only valid file elements (as indicated by a subsequently generated file validation report).

The file validator 114 may include a collection of data processing system executable instructions stored in the memory 104 of the data processing system 102. Typically, the executable instructions may be treated as modules of the data processing system 102. It is preferred to implement the file validator 114 as the collection of executable instructions. Alternatively, the file validator 114 may be modules of hardware integrated into the data processing system 102.

The file validator 114 may include a file element selector 116 (a selecting module of the system 102). The file element selector 116 selects a file element from the file 106, such as FILE ELEMENT_A 108 for example. The file validator 114 also includes a test specification lookup table 124 which may be used by the file element selector 116 to select a test specification (or simply 'test'). The test specification lookup table 124 contains a collection of information, such as: a file element ID (identification) 126 and an associated test specification ID 128 (a test specification or test associated with a file element). The test specification lookup table 124 may include pointers to a set of embedded test specifications 136 (that is, the embedded test specifications are embedded into the file validator 114). The test specification lookup table 124 may also include pointers to a set of un-embedded test specifications 148 (that is, the un-embedded test specifications are not embedded into the file validator 114).

At the time of the creation of the file validator 114, the known test specifications (the test specifications known at time of developing the file validator 114) are embedded into the file validator 114, and the lookup table 124 will include pointers to those known embedded test specification.

For yet-to-be developed test specifications, the lookup table 124 may include pointers which may be used in the future when needed (that is, when the need arises to have the lookup table point to later-developed un-embedded test specifications). In this manner, redevelopment of the file validators may be avoided or prolonged, which may extend the useful life of the file validators; this arrangement may reduce ongoing development costs and distribution of file validators in general.

The file validator 114 also may include a test specification applicator 120 (another module of the data processing system 102). The test application applicator 120 applies a selected test specification (that is for example, a test specification 140 or the test specification 150) depending on the contents of the lookup table 124 (that is, the match to be determined between the file element ID and its assigned or corresponding test specification ID).

The file validator 114 may also include a test specification poster 122. The test specification poster 122 creates the file validation report 154. The file validation report 154 contains a listing of file element IDs 156 and a corresponding list of error messages 158. The error messages 158 may indicate whether corresponding file elements are valid with respect to outcomes of executed test specifications (those test specifications applied or executed by the test specification applicator 120).

In another embodiment of the present invention, it will be appreciated that the set of un-embedded test specifications 146 may reside in the memory of another data processing system (not depicted) which is network connected to the data processing system 102.

Figure 2:
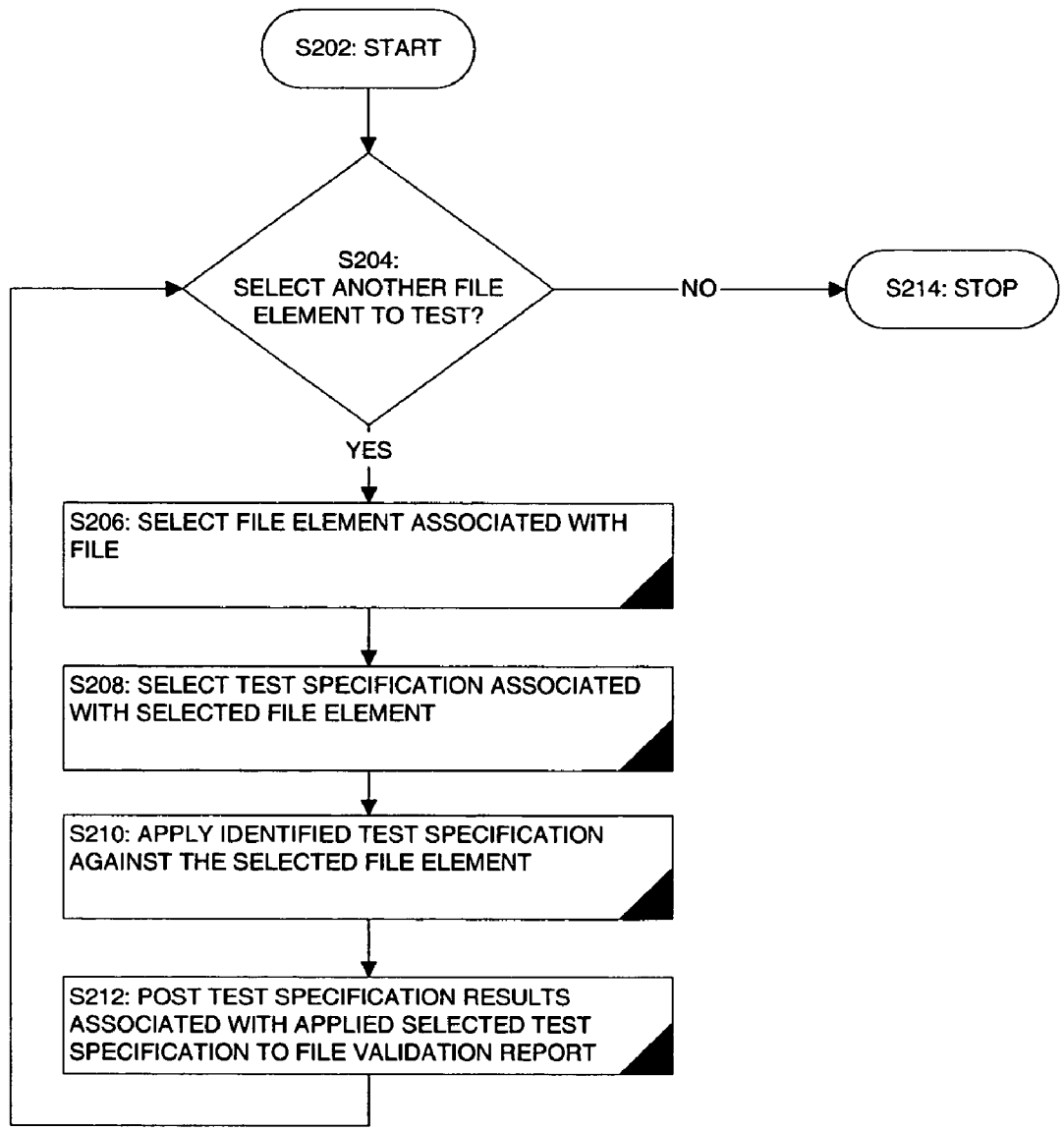
FIG. 2 shows operations of the file validator of FIG. 1.

FIG. 2 shows operations of the file validator 114 of FIG. 1. In operation S202, the file validator 114 initiates and beings execution.

In operation S204, the file validator 114 selects (or identifies) a file element associated with the file 106. The file validator, for example, may examine the file 106 and then determine that the file 106 contains files elements 108, 110 and 112 that need to be tested or checked for file element validity against test specifications corresponding to the selected or identified file elements. In a first iteration of the operation S204, the FILE ELEMENT_A 108 may be identified from the file 106. In a second iteration of the operation S204, the FILE ELEMENT_B 110 may be identified from the file 106. In a third iteration of the operation S204, the FILE ELEMENT_A 112 may be identified from the file 106. The operation S204 may be included in the test specification selector 118.

In operation S208, the file validator 114 selects a test specification associated with a selected file element. In a first iteration of the operation S208, the file validator 114 may use the lookup table 124 and determine or identify the pointer which points or indicates the test specification associated with the selected file element (which in this iteration, the selected file element is file element_A 108). The file validator 114 uses the pointer (stored in the lookup table 124), in which the pointer is associated with the currently selected file element 108. The file validator 114 then determines that a pointer 123 points to the desired test specification. The file validator 114 then examines the set of embedded test specifications 136 to determine whether the desired test specification may be stored in the set 136. The set 136 includes the pointer 123 which is associated with the test specification_1 142. The file validator 114 then selects the test specification_1 142 associated with the pointer 123. Ultimately, this results in the test specification_1 142 being associated with the selected file element_A 108. Then the file validator 114 selects the test specification_1 142 (since this test specification is associated with the selected file element). The operation S208 may be included in the test specification applicator 120.

In a second iteration of the operation S208, the file validator 114 may use the lookup table 124 and determine or identify the pointer which points or indicates the test specification associated with the next selected file element (which in this iteration, the next selected file element is file element_B 110). The file validator 114 uses the pointer (stored in the lookup table 124), in which the pointer is associated with the next selected file element 110. The file validator 114 then determines that a pointer 456 points to the desired test specification (which is associated with the pointer 456). The file validator 114 then examines the set of embedded test specifications 136 to determine whether the desired test specification may be stored (or located) in the set 136. The set 136 includes the pointer 456 which is associated with the test specification_2 144. The file validator 114 then selects the test specification_2 144 associated with the pointer 456. Ultimately, this results in the test specification_2 144 being associated with the selected file element_B 110. Then the file validator 114 selects the test specification_2 144 (since this test specification is associated with the selected file element).

In a third iteration of the operation S208, the file validator 114 may use the lookup table 124 and determine or identify the pointer which points or indicates the test specification associated with the next selected file element (which in this iteration, the next selected file element is the file element_C 112). The file validator 114 uses the pointer (stored in the lookup table 124), in which the pointer is associated with the next selected file element 112. The file validator 114 then determines that a pointer 789 points to the desired test specification (which is associated with the pointer 789). The file validator 114 then examines the set of embedded test specifications 136 to determine whether the desired test specification may be stored (or located) in the set 136. The set 136 does not include the pointer 789. The file validator 114 may resort to locating the pointer 789 in another set of test specifications. For example, the pointer 789 may be a URI (Uniform Resource Identifier) or URL (Uniform Resource Locator) or the like which points to the set of test specifications 146 and also points to the correct test specification stored in the set 146. The set of test specifications 146 is un-embedded in the file validator (that is, the set 146 resides outside of the file validator 114. For example, the set 146 may be stored in the memory 104 or stored in the memory of another data processing system (not depicted) which is network coupled to the data processing system 120.

The Web is an information space. Human beings have a lot of mental machinery for manipulating, imagining, and finding their way in spaces. URIs are the points in that space. Unlike web data formats, where HTML is an important one, but not the only one, and web protocols, where HTTP has a similar status, there is only one Web naming/addressing technology: URIs. Uniform Resource Identifiers (URIs, aka URLs) are short strings that identify resources in the web: documents, images, downloadable files, services, electronic mailboxes, and other resources. They make resources available under a variety of naming schemes and access methods such as HTTP, FTP, and Internet mail addressable in the same simple way. They reduce the tedium of "log in to this server, then issue this magic command . . . " down to a single click. It is an extensible technology: there are a number of existing addressing schemes, and more may be incorporated over time. According to the contemporary view, the term "URL" does not refer to a formal partition of URI space; rather, URL is a useful but informal concept: a URL is a type of URI that identifies a resource via a representation of its primary access mechanism (e.g., its network "location"), rather than by some other attributes it may have. Thus as we noted, "http:" is a URI scheme. An http URI is a URL. The phrase "URL scheme" is now used infrequently, usually to refer to some subclass of URI schemes which exclude URNs.

Turning back to the third iteration of the operation S208, the file validator 114 uses the pointer 789 to locate the set 146, and ultimately, locates the test specification_3 152. The file element_c 112 is not associated with the test specification_3 152. The file validator 114 then selects the test specification_3 152 associated with the pointer 789. Ultimately, this results in the test specification_3 152 being associated with the selected file element_C 112. Then the file validator 114 selects the test specification_3 152 (since this test specification is associated with the selected file element).

In operation S210, the file validator 114 applies the selected test specification (for each iteration of the operation S208) the test specification applicator 120. The operation S210 may be included in the test specification applicator 120.

In operation S212, the file validator 114 posts the test specification results associated with the applied selected test specification to the file validation report 154 (for each iteration of the operation S208). The operation S212 may be included in the test specification poster 122.

The operation S204 is iterated to determine whether the file 106 contains any more file elements to be tested. Once all file elements have been selected, control may be transferred to operation S214 in which case the file validator 114 may stop executing. If there are more file elements to be selected and checked, control may be transferred over to the operation S206.

The detailed description of the embodiments of the present invention does not limit the implementation of the embodiments of the present invention to any particular computer programming language. The embodiments of the present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented may be a result of a particular type of operating system, computer programming language, or data processing system and would not be a limitation of the embodiments of the present invention.

It will be appreciated that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. For a file validator implemented on a data processing system, a file validator implemented method of identifying a test specification to be used for testing validity of a file element associated with a file, the test specification being a member in one of a set of test specifications embedded in the file validator and a set of test specifications not embedded in the file validator, the file validator implemented method comprising the steps of:

selecting the file element;

selecting a pointer associated with the selected file element; and using a pointer to select the test specification associated with the selected file element, the selected test specification being selectable from one of the set of test specifications embedded in the file validator and the set of test specifications not embedded in the file validator.

2. The file validator implemented method of claim 1, wherein said step of selecting of a pointer comprises selecting the pointer from a look up table.

3. The file validator implemented method of claim 2, wherein the look up table comprises file element identifiers associated with test specification identifiers, the file element identifiers identifying file elements associated with the file, the test specification identifiers identifying test specifications belonging to one of the set of test specifications embedded in the file validator and the set of test specifications not embedded in the file validator.

4. The file validator implemented method of claim 3, further comprising the step of:

applying the identified test specification against the selected file element.

5. The file validator implemented method of claim 4, further comprising the step of:

posting a test specification result associated with the applied identified test specification to a file validation report.

6. The file validator implemented method of claim 1, wherein the pointer is a Uniform Resource Identifier.

7. For a file validator implemented on a data processing system, a file validator implemented method of identifying a test specification to be used for testing validity of a file element associated with a file, the test specification being a member in one of a set of test specifications embedded in the file validator and a set of test specifications not embedded in the file validator, the file validator implemented method comprising the steps of:

selecting the file element;

selecting a pointer associated with the selected file element, the pointer being selected from a look up table, the look up table comprising file element identifiers associated with test specification identifiers, the file element identifiers identifying file elements associated with the file, the test specification identifiers identifying test specifications belonging to one of the set of test specifications embedded in the file validator and the set of test specifications not embedded in the file validator;

using a pointer to select the test specification associated with the selected file element, the selected test specification being selectable from one of the set of test specifications embedded in the file validator and the set of test specifications not embedded in the file validator;

applying the identified test specification against the selected file element; and, posting a test specification result associated with the applied identified test specification to a file validation report.

8. The file validator implemented method of claim 7, wherein the pointer is a Uniform Resource Identifier.

* * * * *